Nov. 12, 1957  W. A. ERNST ET AL  2,813,047
ELECTRICAL MEMBERS PROVIDED WITH HIGH TEMPERATURE
ELECTRICAL INSULATION COMPRISING
ORGANOPOLYSILOXANES
Filed March 14, 1956

WITNESSES

INVENTORS
Wentworth A. Ernst, Frank T. Parr,
John W. Evans & Ray E. Lee
BY
ATTORNEY

United States Patent Office 2,813,047
Patented Nov. 12, 1957

2,813,047

ELECTRICAL MEMBERS PROVIDED WITH HIGH TEMPERATURE ELECTRICAL INSULATION COMPRISING ORGANOPOLYSILOXANES

Wentworth A. Ernst and Frank T. Parr, Baltimore, and John W. Evans, Severn, and Ray E. Lee, Glen Burnie, Md., assignors to Westinghouse Electric Corporation, East Pittsburgh, Pa., a corporation of Pennsylvania Application March 14, 1956, Serial No. 571,531

5 Claims. (Cl. 117—218)

The present invention relates to electrical members and has particular reference to electrical members encapsulated and impregnated with high temperature electrical insulation comprising organopolysiloxanes and to processes for preparing such insulated electrical members.

For many applications it is desirable that electrical members be protected by completely enclosing them in insulating structures. Heretofore, it has been proposed to use metallic containers filled with an insulating potting compound to contain the electrical members. In addition to the bulkiness of such potting containers, they require the utilization of bushings and other accessory equipment. This not only greatly increases the cost of the completed members but also unduly increases their weight.

For some time the electrical industry has been searching for a method for completely sealing or encapsulating electrical members within a relatively thin, exteriorly disposed, form-fitting insulating coating associated with an interiorly disposed impregnating composition. Such a combined encapsulating and impregnating composition, to be completely satisfactory, must be capable of operating satisfactorily for relatively long periods of time at relatively high temperatures, for example, on the order of 200° C. to 250° C. Heretofore, various polyester resin compositions have been suggested for such use. However, experience has demonstrated that certain of the polyester resin compositions proposed in the prior art do not function as satisfactorily as desired at such high temperatures. Thus, under certain conditions the resins decompose, crack, split and separate in use with the resultant undesirable development of voids and cracks through which moisture and the like may penetrate thereby reducing or destroying the effectiveness of such compositions as insulating materials.

It is an object of the present invention to provide a process for preparing electrical members with an exteriorly disposed elastomeric form-fitting encapsulating covering and an interiorly disposed impregnating resinous composition, both the encapsulating covering and the impregnating composition comprising certain organopolysiloxanes.

Another object of the present invention is to provide electrical members having an elastomeric, form-fitting exterior coating comprising organopolysiloxane rubber, the interior of said elastomeric coating being filled with a heat-hardened resinous organopolysiloxane.

Other and further objects of the invention will, in part, be obvious and will, in part, appear hereinafter.

In order to indicate more fully the nature and capabilities of the present invention, reference is made to the following description taken in conjunction with the accompanying drawing, in which.

In the attainment of the foregoing objects and in accordance with the present invention there is provided a process for insulating electrical members with certain organopolysiloxanes. Broadly, the process comprises closing all apertures and recesses of the electrical member with a pasty composition and applying quantities of said pasty composition about any projections and sharp corners on the electrical member whereby a smoother and more uniform exterior surface is produced. A removable plug member is applied to the electrical member with the pasty composition at a point on the member where there are apertures leading to the interior of the electrical member. The pasty composition is hardened to form a porous solid mass. A coating of a primer then is applied to the exterior surface of any metal parts of the electrical member which are exposed after first cleaning these parts with an organic solvent. The outer surface of the electrical member then is provided with a form-fitting cover comprising a completely reactive organopolysiloxane having a viscosity sufficient to bridge all the fine apertures in the electrical member without penetrating substantially thereinto and curable to an elastomeric solid. After the covering layer of organopolysiloxane has been partially polymerized, the plug member is removed to form an opening or channel extending through the covering layer. The electrical member is then vacuum impregnated through the opening in the covering layer with a liquid completely reactive organopolysiloxane composition having a viscosity of not over ten poises at 25° C., and preferably below 5 poises, whereby it penetrates into and fills all the interstices in the interior of the electrical member and impregnates the hardened porous composition previously applied as a paste. The second organopolysiloxane composition then is polymerized to a solid, thereby resulting in a completely encapsulating resinous insulation.

Figure 1:
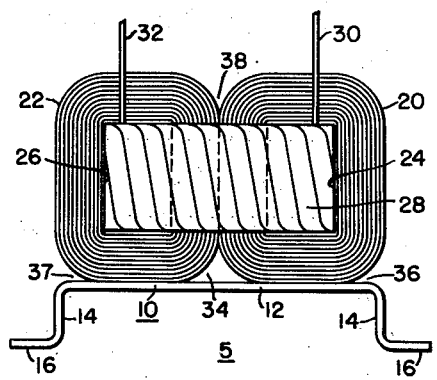
Figure 1 is a view in elevation of a transformer to be encapsulated.

Referring to Fig. 1 of the drawing, there is illustrated a transformer 5 suitable for electronic applications. The transformer 5 comprises a metal mounting bracket 10 composed of a base 12, vertical legs 14 and feet 16. Ordinarily, the feet 16 are provided with openings for the passage of mounting bolts or other fittings therethrough. Fastened to the base 12 of the mounting bracket 10 are magnetic cores 20 and 22, each composed of, for example, a wound strip of magnetic material, which cores may be prepared in accordance with well-known practice. One wound core structure and process for preparing the same which is suitable for use in accordance with this invention is that set forth in Putman Patent No. 2,318,095. The core 20 is provided with a rectangular window 24 and the core 22 is provided with a rectangular window 26 and through both windows 24 and 26 is passed a coil 28 linking the two cores together. The coil 28 may comprise two or more separate windings. Leads 30 and 32 extend outwardly from the coil 28. It should be understood that in practice there may be a considerable number of leads, for example four, six or more, extending from the coil 28.

It will be evident that there are numerous spaces and apertures of substantial size present in the assembled transformer 5. Such spaces and apertures vary considerably from transformer to transformer due to the normal differences in size and shape of the parts. For example, a triangular space 34 exists between the cores 20, 22 and base 12. Wedge-shaped spaces 36 and 37 are present at the outside corners of the base 12 and the coils 20 and 22, respectively. A depression 38 is present at the upper juncture of the two cores. There also is a space (not shown) at the interior of the coil 28. The leads 30 and 32 are relatively thin and flexible and are unsupported. It is desirable to completely encapsulate the transformer into a smooth rounded structure, free from sharp corners and depressions, and to support the leads 30 and 32 in order to assure adequate life and satisfactory electrical properties to the apparatus in service.

In accordance with the present invention, the transformer 5 of Fig. 1 is initially treated to fill all apertures of a size exceeding 0.1 inch across, though it should be understood that surface openings smaller than this may be closed or slightly greater openings (say up to 1/8 inch) may be permitted to be present. Any sharp corners or unsupported projections are filleted. For the filling and filleting, we have found it necessary to employ a pasty composition of a texture similar to that of worked putty. Such a composition is readily applied by hand in a few seconds to the transformer 5 to fill all the apertures or surface openings and to fillet corners and to support any leads or other projecting portions of the electrical member.

The pasty composition that we have found to produce unique results is one consisting essentially of 5 parts by volume of a fibrous insulating material, from 10 to 20 parts by volume of a finely divided inorganic solid, from 10 to 40 parts by volume of a heat hardenable resinous organopolysiloxane binder, and sufficient volatile solvent to render the mixture pasty so that it may be manually applied or shaped without slipping or running off. Ordinarily from 10 to 30 parts by volume of a volatile organic liquid, such as toluene, that is a solvent for organopolysiloxane binder is adequate to prepare a pasty composition. For the fibrous insulating material, it is preferred to employ shredded asbestos fibres or chopped glass fibers or mixtures of these. For the finely divided inorganic solid, the best results have been secured by the use of a diatomaceous earth or a powdered silica aerogel. Numerous organopolysiloxane compositions may be employed as the resinous binder. Such compositions include, for example, organopolysiloxanes having from 1.25 to 2.25 hydrocarbon groups, ordinarily methyl and phenyl groups, per silicon atom in the molecule. Examples of suitable heat hardenable resinous organopolysiloxanes are (1) a polymer comprising 35 mol percent of methyl phenylsiloxy groups, 25 mol percent monomethyl siloxy groups, 20 mol percent monophenylsiloxy groups, 15 mol percent dimethylsiloxy groups and 5 mol percent diphenylsiloxy groups, (2) a methyl polysiloxane having 1.7 methyl groups per silicon atom and (3) a phenyl methyl polysiloxane having 1.8 hydrocarbon groups per silicon atom and a ratio of two methyl groups per phenyl group.

An essential requirement for the composition is that there be a sufficiently small amount of the organopolysiloxane binder in the pasty composition so that when the volatile solvent is driven off, as by heating, the binder will harden and produce a relatively porous mass of material that will withstand some handling without breaking up or powdering. In some cases, the pasty composition may be air dried whereupon the volatile organic solvent evaporates and the resin hardens. It is necessary that the mass of the composition in the hardened state be sufficiently porous to be capable of being impregnated by a fluid resinous composition.

The use of the pasty composition is ordinarily desirable, but is not essential to the satisfactory operation of this invention. It serves only to provide finished electrical members with a more nearly uniform exterior appearance. If a smooth exterior is not needed or desired the use of the composition may be dispensed with without adversely effecting the invention.

Figure 2:
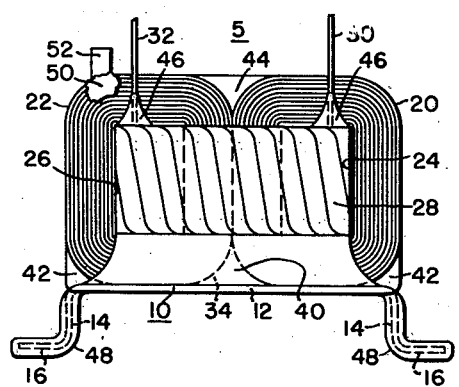
Fig. 2 is a view in elevation of the first stage of treating the transformer of Fig. 1 in accordance with the invention.

As illustrated in Fig. 2 of the drawing, the transformer 5 has been treated with the pasty composition to provide a filleting mass 40 between the base 12 and the cores 20, 22 so as to fill the space 34 and to round off all of the sharp corners. A plug 42 of the pasty composition is applied at each of the outside corners between the base 10 and the cores 20 and 22. Similarly, a plug 44 is applied at the upper part to fill the V-shaped space between the cores 20 and 22. A supporting body 46 of the pasty composition is applied about each of the leads 30 and 32 to support and re-enforce them. Other parts having apertures therein are similarly plugged or filled or filleted with the pasty composition to round off the corners of the transformer and to impart a relatively smooth uniform surface thereto.

Inasmuch as the legs 14 and the feet 16 provide for rigidly mounting the transformer 5 upon a panel or other member, it is ordinarily desirable that they not be coated with an appreciable thickness of resin. Therefore, a layer of a masking compound 48 that is readily strippable from the metal and which is not detrimentally effected by the relatively high processing temperatures of the siloxanes is applied thereto to prevent adhesion of subsequently applied resin. We have successfully employed as a masking composition, a 15% by weight solution of cellulose acetate in acetone, with 5% by weight of a plasticizer, such as dimethyl phthalate or propionate, present in the solution. However, mixtures of ethyl cellulose and mineral oil, or other strippable resinous compositions may be employed as masking compounds as is well known. A thin film of polytetrafluoroethylene or a coating of dimethyl silicone fluid may be applied to the metal to prevent adhesion of subsequently applied resin thereto.

At the upper part of the transformer at a point where fine passages open at the exterior surface and lead to the innermost portions of the cores and coil, there is applied a channel-forming member or plug 52 composed of a suitable elastomer or resin which may be held in place with a wad 50 of the paste-like composition. The plug 52 may be composed of neoprene rubber, silicone rubber, polytetrafluoroethylene or cellulose acetate, for example.

The treated transformer is preferably dried and heat treated to evaporate the solvent from the applied masses of pasty composition 40—42—44—46 and 50 thereby to harden the binder and leave these masses in a hardened state but quite porous. The transformer 5 may be heated in an oven for one or more hours at a temperature of 135° C. for this purpose. Preliminary air drying has given good results. The oven temperatures may vary from 80° C. to 175° C. and the time varied inversely with the temperature.

All exposed metal parts of the transformer then are cleaned and provided with a highly adherent titanate and silicate ester primer coating. Highly successful results were obtained with a 2% solution of tetra-n-butyl titanate in an anhydrous organic solvent such as hexane. The primer coating is allowed to hydrolyze in air for about eight hours at a temperature of from 25° to 35° C. At the end of this period the hexane has evaporated leaving a dry coating. Copper and certain other metals are known to inhibit the proper polymerization of organopolysiloxane compositions. The primer coating applied to metal parts of the transformer 5 helps to coat the metal with a highly adherent film and promotes adhesion of subsequently applied siloxane compositions and also prevents the metal from interferring with the desired polymerization of the siloxanes. Materials such as ethyl silicate, tetra isopropyl titanate, tetra 2-ethylhexyl titanate, tetra stearyl titanate are examples of other materials suitable for use as the primer.

The transformer 5 then is in condition for the application thereto of an exterior form-fitting coating or capsule of a relatively thick elastomeric covering of an organopolysiloxane or silicone resin. It is desirable to employ for this purpose a relatively high viscosity liquid, completely reactive organopolysiloxane which cures to an elastomer, and to apply such liquid siloxane to transformer 5 by dipping techniques. The liquid polysiloxanes are compounds comprising essentially silicon atoms connected to each other by oxygen atoms through silicon-oxygen linkages, having an R to Si ratio of from 1.98 to 2.25, and have the following recurring group:

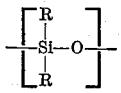

wherein R represents monovalent organic radicals selected from the group consisting of alkyl radicals having not more than four carbon atoms and phenyl, tolyl, and xylyl radicals, at least 50% being alkyl groups. These liquid compositions may include some cyclic silicones.

We have secured good results with silicones in which the majority, if not all, of the monovalent organic radicals are methyl radicals. A gum having a minor proportion of phenyl radicals, preferably present as phenylmethyl silicon-oxide groups

or diphenyl silicon-oxide groups

gives good results. Similar results also are obtained when tolyl or xylyl radicals are substituted for the phenyl radicals.

The siloxane elastomer may be prepared by hydrolyzing a dialkyl silane or a mixture of a dialkyl and a diphenyl silane, the silanes containing an average of approximately two readily hydrolyzable groups per silicon atom. Typical readily hydrolyzable groups are halogens, for example, chlorine or fluorine and alkoxides, for example, methoxy and ethoxy, and amino groups. While it is preferred that the alkyl groups attached to silicon be entirely methyl, because of the outstanding qualities of dimethyl siloxane elastomers, other monovalent hydrocarbon groups, such as ethyl, propyl, and the like, may be present.

Upon hydrolysis of the dialkyl silane or mixed dialkyl silane and diaryl silane, there results oily silicone type polymers in which a majority of the units have the structure

These oily siloxane polymers, for example, a dimethyl silicone oil, may be treated with various agents to convert them to high viscosity liquid silicones. Suitable examples of such agents include ferric chloride, concentrated sulfuric acid, sulfuryl chloride, sulfuryl bromide, sulfuryl fluoride, phenyl phosphoryl dichloride, and alkoxy phosphoryl dihalides. The high viscosity liquids also may be produced in other known ways, as by treating the oils with an acyl peroxide.

It is desirable to add finely divided fillers to the silicone oils or to the high viscosity liquid silicones before converting the same to elastomers to increase their thixotropic properties. Heat resistant inorganic compounds are preferred for this purpose. Examples thereof include asbestos, clay, barium titanate, iron oxide, bentonite, zinc oxide, lithopone, titania, magnesia, graphite, slate, mica, diatomaceous earth, calcium carbonate, lead oxide, alumina, and calcium silicate.

Acyl peroxides suitable for converting the siloxane oils, gums or gels to elastomers contain at least one aromatic acyl radical. Examples of such peroxides are benzoyl peroxide, benzoyl acetyl peroxide, dinaphthoyl peroxide, and benzoyl lauryl peroxide. The acyl radical in such peroxides may contain an inorganic substituent such, for example, as a halogen or a nitro group. The amount of acyl peroxide employed to convert a silicone liquid to an elastomer ordinarily need not exceed 10% of the weight of the silicone with 2% to 4% generally being sufficient. If the liquid siloxane is of such a high viscosity as to render its application to members by dipping techniques difficult, it may be thinned to the desired viscosity by the addition of an organic solvent such as toluene, hexane, or the like.

The amount of the organic filler to be incorporated in the liquid siloxane may be varied over a wide range of proportions. As little as 25 parts of the inorganic filler per hundred parts of the liquid silicone will produce good results. Ordinarily, however, the amount of the finely divided filler will vary from 100 parts to 200 parts and more for each 100 parts of the liquid siloxane.

Figure 3:
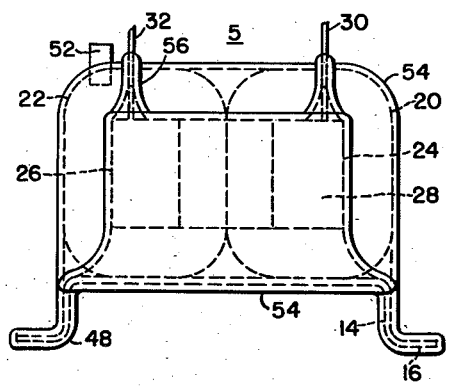
Fig. 3 is a view in elevation showing an outer encapsulating coating applied to the treated transformer of Fig. 2.

Transformer 5 is dipped in the viscous silicone liquid and then partially cured by heating in an oven at about one hour. After partial curing the encapsulated transformer 5 has the appearance as shown in Fig. 3 of the drawing, wherein a smooth, form-fitting encapsulating coating 54 of uniform thickness is present about the entire transformer except for the legs 14, feet 16, and the free ends of leads 30 and 32. The leads 30—32 are covered and protected for a substantial distance along their length by the layer 56 of the encapsulating resin. However, the interior of the coil and cores is unimpregnated.

In order to fill the interior of the coil 28 and cores 20 and 22, the plug 52 is withdrawn thereby producing an opening 60 extending through the coating 54 and leading to the interior of the transformer 5. The opening 60 leads to interstices in the coil 28 which, in turn, connect with interstices in the cores 20 and 22. It should be understood that several plugs 52 may be used and withdrawn thereby leaving a plurality of openings 60 at the upper part of the electrical member.

The encapsulated unit shown in Fig. 3 of the drawing is then placed in an evacuable container and subjected to a vacuum of at least five inches of mercury absolute pressure. The opening 60 left when the plug 52 is removed should be maintained uppermost. When the desired vacuum is attained, there is introduced into the container a completely reactive liquid organopolysiloxane composition of such viscosity that it will readily penetrate into the interestices within the interior of the transformer and fill all of the space within the cover 54. This composition should be applied in an amount to cover the entire transformer by at least one-quarter of an inch. If desired, after the transformer has been completely immersed for a few minutes, the vacuum may be broken and either atmospheric pressure may be admitted or super atmospheric pressure may be applied to the surface of the composition in order to force the composition into the interstices of the insulation of the electrical member and the spaces within cover 54. The impregnation may be repeated a number of times in order to insure the most thorough impregnation.

Figure 4:
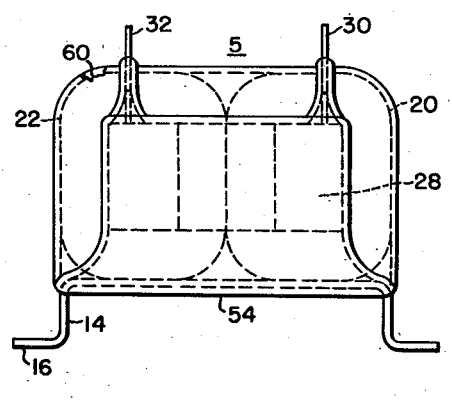
Fig. 4 is a view in elevation of a completely encapsulated and impregnated transformer.

After such impregnation, the transformer should be carefully removed from the container in its upright position so that the opening 60 left by plug 52 is uppermost, and heated until the completely reactive liquid composition polymerizes into a solid. The transformer may be re-impregnated at least once in a similar manner in order to fill any shrinkage spaces that may have been left by the polymerization of the first impregnation of siloxane resin, or in case a fault in cover 54 has allowed resin to escape during the first impregnation. The subsequently applied impregnating resin is similarly polymerized by heating. After the second or later impregnation of resin has been completely polymerized, there results a completely impregnated and encapsulated unit as shown in Fig. 4 of the drawing. The masking composition 48 then is removed from the feet and legs of the supporting bracket to expose the bare metal. It will be noted that the leads 30 and 32 of the transformer are well supported and failure of the insulation at the leads is thereby minimized. There will be present no cracks or surface openings or other defects as would be possible if the transformer having as many surface irregularities as shown in Fig. 1, were not initially treated to produce fillets and the like as illustrated in Fig. 2 of the drawing.

The completely reactive liquid organopolysiloxane composition employed for the impregnation of the interior of the cores and coils of transformer 5 comprises at least 10% by weight of a low viscosity organopolysiloxane which is described more fully in copending application Serial No. 515,259, which application is assigned to the assignee of the present invention. In particular, the liquid impregnating composition comprises a polysiloxane of a low viscosity and of low vapor pressure at temperatures up to 100° C. and higher, and having the following structural formulation:

(1)

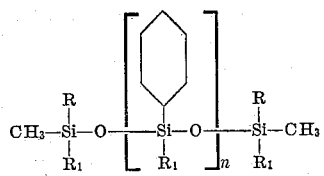

wherein R represents a monovalent radical selected from the group consisting of alkyl radicals having not exceeding four carbon atoms and aryl radicals comprising a benzene ring with not more than two methyl groups substituted for hydrogen, $R_1$ represents a monovalent radical selected from the group consisting of vinyl and methyl radicals, there being at least two vinyl radicals per molecule, and $n$ is at least two. When $n$ has an average value of from 2 to 10, the viscosity is from about 0.10 to 1 poise at 25° C. The most thermally stable and lowest viscosity polysiloxane fluids are obtained when R is methyl in Formulation 1.

The polysiloxane compounds wherein $n$ is 1 in the above Formulation 1 are quite volatile. When coils impregnated with such polysiloxanes are heated to 100° C. to 140° C. copious fumes and vapors of the latter compounds are evolved. Compounds wherein $n$ is 2 exhibit a marked decrease in vapor pressure as compared to the compounds wherein $n$ is 1, for instance, they will not boil at 85° C. to 100° C. even at pressures of 0.1 mm. Hg. Consequently, it is preferred to carry out the reactions to produce a minimum of polysiloxane compounds wherein $n$ is 1. If there is present more than a few percent by weight of polysiloxane compounds wherein $n$ equals 1, they can be and should be separated by fractional distillation. Small quantities of trisiloxane compound can be present in the compositions for some uses, particularly if two vinyl groups are present per molecule.

Particularly good polysiloxanes are those having the following formulation:

(2)

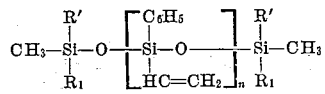

where R' represents a monovalent radical selected from the group consisting of methyl and phenyl radicals and $R_1$ represents a monovalent radical selected from the group consisting of methyl and vinyl radicals, there being an average of at least two vinyl radicals per molecule, and $n$ is at least two.

Especially low viscosity fluids comprise the following formulation:

(3)

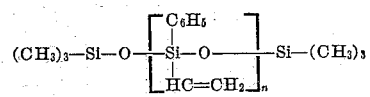

where $n$ is at least 2 and has an average value of from 2 to 10.

Fluids corresponding to Formula 1 having a viscosity of from approximately 10 to 40 centipoises at 25° C. are obtained when $n$ in the formula has an average value of from 2.0 to 3.5. In Formula 3, when $n$ has an average value of 2.5, the viscosity of the fluid is approximately 15 centistokes at 25° C., and when $n$ has an average value of 3, the viscosity is approximately 20 centistokes at 25° C.

The low viscosity polysiloxane liquids of the present invention, for example those of Formulation 3, may be prepared by hydrolyzing (a) from 2 to 10 mols, or more, of a phenylvinylsilane monomer in which the remaining two groups attached to silicon comprise a readily hydrolyzable radical such as chlorine, fluorine, alkoxy or aryloxy radicals such, for example, as methoxy, ethoxy or phenoxy, or an amine group with (b) two mols of an end blocking agent such, for example, as a silane monomer having only one readily hydrolyzable group attached to silicon while the other radicals attached to silicon are selected from the group consisting of methyl, phenyl and vinyl radicals, there being not more than one phenyl or more than one vinyl radical on such monomer. The mixture is hydrolyzed with water or an aqueous acid, such as 5% or 20% sulfuric acid. The hydrolyzate is condensed with an acid or an alkali to the polysiloxane. The hydrolysis and condensation of the mixture may be carried out simultaneously. One mol of a disiloxane may be substituted for each two mols of the (b) silane to furnish end blocking groups by cleavage of the disiloxane by an acid condensation catalyst. In such disiloxanes there are six hydrocarbon radicals attached to the two silicon atoms, there being at least one methyl radical on each of the silicon atoms, and not exceeding one phenyl and one vinyl radical on each of the silicon atoms. Examples of such disiloxanes are hexamethyl disiloxane, vinylpentamethyldisloxane and divinyltetramethyldisiloxane.

Polysiloxane compositions within the scope of Formula 1 may be employed alone for impregnating electrical members. However, they cure into hard and relatively brittle resinous solids. More flexible and tougher solids are obtained if the low viscosity polysiloxane compositions within the scope of Formula 1 are admixed with compatible more viscous, long chain polysiloxane liquids having reactive >C=C< groups, such as vinyl, allyl and methallyl, attached to silicon by carbon-silicon bonds. The mixed liquid polysiloxane compositions comprise (a) at least 10% by weight of the polysiloxane of Formulation 1, of a viscosity of less than one poise, and preferably below 50 centipoises, at 25° C. and (b) the balance, comprising at least 10% by weight of the mixture, being the long chain polysiloxanes having >C=C< groups and of a viscosity of above 1 poise, and preferably above 10 poises, at 25° C.

The following examples illustrate the preparation of long chain, high viscosity organopolysiloxanes which may be admixed with the siloxane of Formulation 1.

EXAMPLE I

An organopolysiloxane was prepared by hydrolyzing a toluene solution of 4 mols of dichlorophenylvinylsilane and 6 mols of dichloromethylphenylsilane with ice water. The toluene solution with this hydrolyzate was then refluxed for several hours in the presence of KOH or other strong alkali. The alkali was then neutralized by shaking with dilute hydrochloric acid. The viscosity was 13 poises at 25° C.

EXAMPLE II

A polysiloxane liquid was prepared as follows: A mixture of 37.5 parts of diethoxyphenylvinylsilane, 30 parts of diethoxydimethylsilane and 81.2 parts of 1,4-bis-(ethoxydimethylsilyl) benzene was dissolved in about 165 parts of benzene contained in a vessel. The vessel was placed in an ice bath and cooled to 0° C. The solution was hydrolyzed by adding about 100 parts of 80% sulfuric acid while stirring vigorously over a period of about one hour. The solution was removed from the ice bath and stirred for an additional hour, crushed ice being added near the end. The benzene solution containing the condensate was permitted to separate out and the acid-water layer was discarded. Free acid was washed from the benzene solution by treatment with sodium bicarbonate. Water and benzene were then removed by evaporation using heat and vacuum, leaving about 80 parts of a polymerizable intermediate organosiloxane fluid having a viscosity of 6 poises at 25° C.

Mixtures of siloxanes of Formula 1 and Examples I and II provide a combination of compatible, completely reactive siloxanes of a viscosity of more than 0.2 poise at 25° C. and generally of the order of 1 to 5 poises at 25° C. Mixtures consisting essentially of (a) 10% by weight of the liquid polysiloxane of Formula 3, where $n$ has an average value of 2.5 and the siloxane has a viscosity of 15 centistokes at 25° C., and (b) the balance (90%) the polysiloxane of Example I, which after neutralization of the alkali but prior to heating at 150° C. to 200° C., had a viscosity of 13 poises, produces a mixture of a viscosity of less than 4 poises at 25° C. When the 6 poise polysiloxane oil of Example II is admixed with the 20 centipoise polysiloxane of Formulation 3, wherein $n$ has an average value of 3, in proportions ranging from 30% to 70% by weight of the former, low viscosity conjoint impregnating fluids of a viscosity of less than 4 poises at 25° C. result. These admixed liquid polysiloxane compositions when cured produce tough solid resinous bodies of excellent strength.

All the polysiloxane compositions employed in this invention, namely, pasty composition 40—42—44—46—50, cover 54, and the liquid impregnating composition, may be cured to solid polymers by heating or irradiating with actinic or ultra-violet radiation, particularly when the compositions have been admixed with a vinyl polymerization catalyst. Such catalysts may be employed in an amount of from 0.1% to 2% by weight, although somewhat larger or smaller amounts may be employed if desired. Furthermore, polymerization accelerators such as driers, for instance cobalt naphthenate, may be added with such catalysts in an amount of from about 0.01% to 0.05% by weight.

The polysiloxanes may be cured, in the absence of any added catalyst, by subjecting them to either ultraviolet light or radiation of higher frequency, including gamma rays or electron beam radiation, which latter may be obtained from a Van de Graaff generator, or from a radioactive material such as radioactive cobalt which will apply electrons and gamma rays thereto. The compositions may be subjected to electron beam radiation of at least 0.05 m. e. v. to apply from 2 to 50 mega REP to produce solid polymers.

In order to indicate even more fully the advantages and capabilities of the present invention, the following specific example is set forth:

EXAMPLE III

A transformer, such as that indicated by reference numeral 5 in the accompanying drawing, is insulated by first applying a pasty composition to all spaces and gaps in the transformer to give the transformer a more uniform surface and to maintain a filling plug, such as represented by 52 on the drawing, in position. The pasty composition comprises 5 parts by volume of shredded asbestos fiber, 15 parts by volume of diatomaceous earth, 15 parts by volume of 1,3-bis-(trimethyl)-2-phenyl methyl trisiloxane and sufficient toluene to form a pasty composition. The transformer unit then is baked at 110° C. for about one hour to drive off the toluene solvent and then given a final baking at 200° C. for about five hours to completely cure the pasty composition to a porous mass. A layer of a readily strippable masking compound is applied to legs 14 and feet 16. The compound comprises a 15% by weight solution of cellulose acetate in acetone with 5% by weight of dimethyl phthalate plasticizer present in the solution. Thereafter, the exterior surfaces of all exposed metal parts are provided with a primer coating comprising a 2% anhydrous hexane solution of tetra-m-butyl titanate. The primer coating is permitted to stand at room temperature (25°-35° C.) for about eight hours, at the end of which time it is hydrolyzed and a dried coating covers the metal surfaces. The unit then is dipped into a suitable tank or vessel containing a liquid completely reactive dimethyl silicone of the consistency of honey. The unit is left submerged within the silicone for about five minutes. Thereafter, it is removed from the tank of silicone, permitted to drain in air for ten minutes and then placed in a 60° C. oven for a period of twenty minutes to complete draining and eliminate surface bubbles. The unit next is placed in an oven maintained at 160° C. for one hour in order to partially cure the coating. The unit is allowed to cool to room temperature and a second coating of liquid dimethyl silicone is applied following this same procedure whereby a form-fitting encapsulating elastomeric covering is applied about the exterior surface of the unit. The plug member 52 then is removed, leaving an opening through the covering leading into the transformer 5. The unit then is placed in a vacuum chamber and placed under a pressure of 1 mm. of mercury for 15 minutes. A quantity of a liquid organopolysiloxane impregnating composition consisting essentially of 50% by weight of the liquid polysiloxane of Formula 3 above and 50% by weight of the organopolysiloxane of Example I, catalyzed with 2% by weight of ditertiary butyl peroxide, then is introduced into the vacuum chamber to a depth sufficient to cover the unit by about one-quarter inch. A pressure of 1 mm. of mercury is maintained for 30 minutes within the chamber. The vacuum then is broken and the unit is allowed to remain submerged for an additional 30 minutes. The unit then is removed from the chamber, drained for two minutes and cured in a 160° C. oven for 8 hours. Thereafter, a third application of an encapsulating coating may be applied about the unit in accordance with the procedure described hereinabove. This seals the opening 60. The unit is given a final cure at 200° C. for a period of about 15 hours.

Several transformer units were prepared in accordance with the procedure of Example III and subjected to various tests as described hereinbelow.

Initially five transformers were subjected to a heat aging test in an oven under load. A potential difference of 500 volts was applied between the primary and secondary winding to stress the insulation during the aging test. The ambient temperature within the oven was maintained at 160° C. throughout the test. Losses in the transformer produced an additional internal rise to afford the desired hot-spot temperature. The load was varied to give the desired temperature rise. After 500 hours the test was discontinued; each unit was still operating and as indicated in Table I no defects in the applied insulation were observed.

Table I

HEAT AGING TEST

| Unit Number | Hot Spot Temperature, (° C.) | Time Under Test, (hours) | Remarks |
|---|---|---|---|
| 1 | 200 | 500 | No observed defects. |
| 2 | 180 | 500 | Do. |
| 3 | 200 | 500 | Do. |
| 4 | 225 | 500 | Do. |
| 5 | 250 | 500 | Do. |

Minimum insulation resistance measurements then were made on each of these five units before and after three environmental tests performed in the following order: thermal shock test, humidity test and salt spray test. The lowest insulation resistance value for any of the five transformer units prior to any of these tests was 150,000 megohms.

The thermal shock test comprised exposing the units to 85° C. ambient temperature for four hours followed immediately by exposure to —55° C. ambient temperature for four hours. This cycle was repeated three times. Minimum insulation resistance values after the final hot exposure (85° C.) and also after the final cold exposure (—55° C.) are set forth in Table II.

*Table II*

THERMAL SHOCK TEST

| Unit | After Final +85° C. | | After Final —55° C. | | Remarks |
|---|---|---|---|---|---|
| | Winding | Megohms | Winding | Megohms | |
| 1 | Primary to Ground. | 150,000 | All | 500,000 | No cracks appeared. |
| 2 | All | 100,000 | Primary to Ground. | 200,000 | Do. |
| 3 | Primary to Ground. | 100,000 | do | 200,000 | Do. |
| 4 | do | 150,000 | do | 200,000 | Do. |
| 5 | do | 150,000 | do | 200,000 | Do. |

As illustrated in Table II, the minimum insulation resistance value observed in the thermal shock test was 100,000 megohms.

The units were subjected to the humidity test by exposing them to a temperature of 71° C. and a relative humidity of 95% for six hours. The temperature then was dropped gradually to 30° C. over a sixteen hour period. The insulation resistance was measured after ten such cycles, one cycle per day, and again after an additional five cycles. Upon the completion of the 15 day test, measurements were made within one hour after removal from the humidity chamber and again after an additional two days exposure to room temperature and humidity conditions. The results of these tests are set forth in Table III.

*Table III*

HUMIDITY TEST

| Unit | After 10 Days | | After 15 Days | | 15 Days Test Plus 2 Days at Room Temp. | | Remarks |
|---|---|---|---|---|---|---|---|
| | Winding | Megohms | Winding | Megohms | Winding | Megohms | |
| 1 | Primary to Secondary. | 500 | Primary to Secondary. | 200 | Primary to Secondary. | 10,000 | No cracks appeared. |
| 2 | do | 1,200 | Primary to Ground. | 10 | Secondary to Ground. | 1,200 | Do. |
| 3 | do | 500 | Secondary to Ground. | 1 | do | 0.6 | Do. |
| 4 | do | 750 | Primary to Secondary. | 310 | Primary to Ground. | 1,200 | Do. |
| 5 | do | 800 | do | 150 | Secondary to Ground. | 5,000 | Do. |

The five units then were placed in a chamber and exposed to salt spray for a period of 50 hours to determine their minimum insulation resistance after such exposure. Upon removal from the chamber the units were rinsed with distilled water and surface moisture was wiped off. The resistance determinations were made within one hour after removal of the units from the chamber. The results of this test are set forth in Table IV.

*Table IV*

SALT SPRAY TEST

| Unit | After 50 Hours | | Remarks |
|---|---|---|---|
| | Winding | Megohms | |
| 1 | Secondary to Ground | 1,300 | No cracks appeared. |
| 2 | do | 10 | Do. |
| 3 | do | 0.8 | Do. |
| 4 | Primary to Ground | 180 | Do. |
| 5 | Secondary to Ground / Primary to Secondary | Less than .1 / 800 | Do. |

Resistance determinations then were made on these units 3 days and 5 days after removal from the salt spray chamber as indicated in Table V. After 5 days air drying under room temperature and humidity conditions, the insulation resistance had increased in all units except in unit 2. After operating for one day at full load under usual room conditions the resistance in all units increased to a value greater than 1,000,000 megohms.

*Table V*

| Unit | 3 Days After Salt Spray | | 5 Days After Salt Spray | | After 24 Hour Load Test | |
|---|---|---|---|---|---|---|
| | Winding | Megohms | Winding | Megohms | Winding | Megohms |
| 1 | Primary to Ground. | 20,000 | All | 100,000 | All | Above 1,000,000. |
| 2 | do | 12,000 | Primary to Ground. | 30 | do | Do. |
| 3 | do | 1.6 | do | 6 | do | Do. |
| 4 | do | 75 | do | 800 | do | Do. |
| 5 | do | 10,000 | do | 50,000 | do | Do. |

Two additional transformer units, prepared in accordance with the procedure described in Example III, also were subjected to the environmental tests described hereinabove, the tests being run, however, in a different order. The humidity test was run first. After 15 days the lowest insulation resistance value determined was 700 megohms. After three cycles in the thermal shock test the lowest insulation resistance value was 100,000 megohms. After 50 hours exposure to salt spray the lowest insulation resistance value was 12,000 megohms. These two units then were heat aged for 500 hours at approximately 250° C. No electrical failure occurred, although a small surface crack was observed in one unit after this test. Then, 1,500 volts were applied between the windings and the windings and ground. No breakdown was observed.

The foregoing test results illustrate the excellent insulation resistance exhibited by electrical members at temperatures up to 250° C., which members have been insulated by encapsulation and impregnation in accordance with the present invention. As a comparison, transformers encapsulated and impregnated with a polyester resin well known in the art did not give these satisfactory results. Such units failed after two hours when heat aged at 250° C. as evidenced by the formation of large cracks in the insulation. After an additional 3½ hours at 270° C. the polyester resin insulated units exhibited further insulation deterioration by an increase in the size of the cracks formed. A black liquid exuded from some of the cracks and discolored the insulation.

It should be understood that while only a single coating 54 has been illustrated as having been applied to the exterior of transformer 5, in the accompanying drawing, two or more coatings may be applied depending on what thickness of insulation is required and also upon the size and shape of the apparatus being treated. Furthermore, while the drawing illustrates the treatment of a transformer having many surface irregularities, the invention is also applicable to the encapsulation and impregnation of electrical members, such as capacitors, which do not have such surface irregularities. In the treatment of capacitors and like smooth surfaced members the utilization of masses of pasty composition 40—42—44—46—50 is unnecessary.

Thus, while the invention has been explained in detail with relation to a transformer, it should be understood that numerous other types of electrical apparatus may be similarly treated. For example, field coils, solenoid coils, and the like may be treated in accordance with this invention to produce members exhibiting substantially no interior corona and having exceptional ability to withstand moisture and the effects of the elements.

Since certain changes may be made in the above invention and different embodiments of the invention may be made without departing from the scope thereof, it is intended that all matter contained in the above described disclosure shall be interpreted as illustrative and not in a limiting sense.

We claim as our invention:

1. In the process of preparing an encapsulated electrical member comprising an electrical conductor having solid insulation applied thereto, said member having interstices therein and irregular surfaces and relatively large apertures and recesses open at the exterior thereof, the improvement including the steps which comprise (1) substantially closing the apertures and recesses with a pasty composition and applying quantities of said pasty composition about any projections and sharp corners whereby a smoother and more uniform exterior surface is produced on the member, said pasty composition consisting essentially of 5 parts by volume of a fibrous insulating material, from 10 to 20 parts by volume of a finely divided inorganic solid, from 10 to 40 parts by weight of a heat hardenable organopolysiloxane binder, and sufficient volatile solvent to render the mixture pasty whereby it may be applied without running off, (2) heating the pasty composition to drive off the solvent and harden the composition to a porous solid mass, (3) applying a removable plug member to the electrical member at a point where there are apertures leading to the interior of the electrical member, (4) applying a coating of a primer selected from the group consisting of titanate and silicate esters to the exterior surface of any metal parts of the electrical member which are exposed, (5) encapsulating the entire outer surface of the electrical member within a form-fitting covering of a liquid completely reactive organopolysiloxane having a viscosity high enough to bridge all the fine apertures in the electrical member without penetrating substantially into them, (6) polymerizing the completely reactive organopolysiloxane to provide an elastomeric encapsulating cover about the electrical member, (7) withdrawing the plug member whereby an opening is formed in the covering, (8) vacuum impregnating the electrical member through the opening in the cover with a liquid completely reactive organopolysiloxane composition having a viscosity of not over 10 poises at 25° C. whereby it penetrates into and completely fills all the spaces within the interior of the elastomeric encapsulating cover about said electrical member and impregnates the hardened porous composition previously applied as a paste, said liquid organopolysiloxane composition comprising (a) at least 10% by weight of a siloxane having the formula

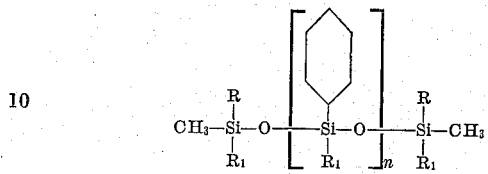

wherein R represents at least one monovalent organic radical selected from the group consisting of alkyl radicals having not more than four carbon atoms and phenyl, tolyl and xylyl radicals, R₁ represents at least one monovalent organic radical selected from the group consisting of methyl and vinyl groups, and $n$ is at least two and has an average value of from 2 to 10 and (b) the balance of said liquid organopolysiloxane composition being another liquid organopolysiloxane which is compatible with said first liquid organopolysiloxane, and polymerizing the impregnating organopolysiloxane composition.

2. In the process of preparing an encapsulated electrical member comprising an electrical conductor having solid insulation applied thereto, the improvement including the steps which comprise (1) applying a removable channel-forming member to the electrical member at a point where there are apertures leading to the interior of the electrical member, (2) applying a coating of primer selected from the group consisting of titanate and silicate esters to the exterior surface of any metal parts of the electrical member which are exposed, (3) encapsulating the entire outer surface of the electrical member within a form-fitting covering of a liquid completely reactive organopolysiloxane having a viscosity sufficiently high to bridge any fine apertures in the electrical member without penetrating substantially into them, (4) polymerizing the completely reactive organopolysiloxane to provide an elastomeric encapsulating cover about the electrical member, (5) withdrawing the channel-forming member whereby an opening is formed in the covering, (6) vacuum impregnating the electrical member through the opening in the cover with a liquid completely reactive organopolysiloxane composition having a viscosity of not over 10 poises at 25° C. whereby it penetrates into and completely fills the spaces within the interior of the elastomeric encapsulating cover about said electrical member, said liquid organopolysiloxane composition comprising (a) at least 10% by weight of a siloxane having the formula

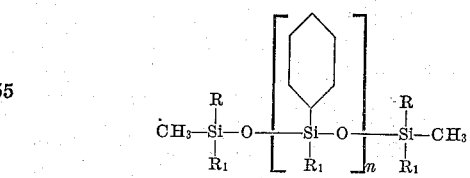

wherein R represents at least one monovalent organic radical selected from the group consisting of alkyl radicals having not more than four carbon atoms and phenyl, tolyl and xylyl radicals, R₁ represents at least one monovalent organic radical selected from the group consisting of methyl and vinyl groups and $n$ is at least two and has an average value of from 2 to 10 and (b) the balance of said liquid organopolysiloxane composition being another liquid organopolysiloxane which is compatible with said first liquid organopolysiloxane, and polymerizing the impregnated organopolysiloxane composition.

3. In the process of preparing an encapsulated electrical member comprising an electrical conductor having solid insulation applied thereto, said member having interstices therein and irregular surfaces and relatively large apertures and recesses open at the exterior thereof, the improvement including the steps which comprise (1) substantially closing the apertures and recesses with a pasty composition and applying quantities of said pasty composition about any projection and sharp corners whereby a smoother and more uniform exterior surface is produced on the member, said pasty composition consisting essentially of 5 parts by volume of a fibrous insulating material, from 10 to 20 parts by volume of a finely divided inorganic solid, from 10 to 40 parts by weight of a heat hardenable organopolysiloxane binder, and sufficient volatile solvent to render the mixture pasty whereby it may be applied without running off, (2) heating the pasty composition to drive off the solvent and harden the composition to a porous solid mass, (3) applying a removable channel-forming member to the electrical member at a point where there are apertures leading to the interior of the electrical member, (4) applying a primer coating of tetra-n-butyl titanate to the exterior surface of any metal parts of the electrical member which are exposed, (5) dipping the electrical member in a quantity of a liquid completely reactive organopolysiloxane having a viscosity sufficiently high to bridge all the fine apertures in the electrical member without penetrating substantially into them, (6) polymerizing the liquid completely reactive organopolysiloxane to provide an elastomeric encapsulating cover about the electrical member, (7) withdrawing the channel-forming member whereby an opening is formed in the covering, (8) vacuum impregnating the electrical member through the opening in the cover with a liquid completely reactive organopolysiloxane composition having a viscosity of not over 4 poises at 25° C. whereby it penetrates into and completely fills the spaces within the interior of the elastomeric encapsulating cover about said electrical member and impregnates the hardened porous composition previously applied as a paste, said liquid organopolysiloxane composition comprising (a) at least 10% by weight of a siloxane having the formula

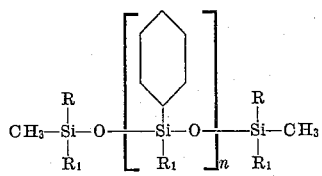

wherein R represents at least one monovalent organic radical selected from the group consisting of alkyl radicals having not more than four carbon atoms and phenyl, tolyl and xylyl radicals, $R_1$ represents at least one monovalent organic radical selected from the group consisting of methyl and vinyl groups, and $n$ is at least two and has an average value of from 2 to 10 and (b) the balance of said liquid organopolysiloxane composition being another liquid organopolysiloxane which is compatible with said first liquid organopolysiloxane, and polymerizing the impregnating organopolysiloxane composition.

4. In the process of preparing an encapsulated electrical member comprising an electrical conductor having solid insulation applied thereto, said insulation having interstices therein, the improvement including the steps which comprise (1) applying a coating of primer selected from the group consisting of titanate and silicate esters to the exterior surface of any metal parts of the electrical member which are exposed, (2) dipping the electrical member in a quantity of a liquid completely reactive organopolysiloxane having a viscosity sufficiently high to provide a form-fitting encapsulating covering about the electrical member, (3) polymerizing the liquid completely reactive organopolysiloxane to provide an elastomeric encapsulating cover about the electrical member, (4) forming an opening through the elastomeric cover, (5) vacuum impregnating the electrical member through the opening in the cover with a liquid completely reactive organopolysiloxane composition having a viscosity of not over 10 poises at 25° C. whereby it penetrates into and completely fills the spaces within the interior of the elastomeric encapsulating cover about said electrical member, said liquid organopolysiloxane composition comprising (a) at least 10% by weight of a siloxane having the formula

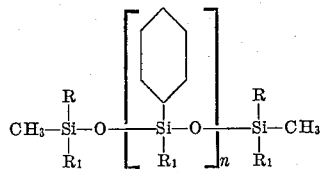

wherein R represents at least one monovalent organic radical selected from the group consisting of alkyl radicals having not more than four carbon atoms and phenyl, tolyl and xylyl radicals, $R_1$ represents at least one monovalent organic radical selected from the group consisting of methyl and vinyl groups, and $n$ is at least two and has an average value of from 2 to 10 and (b) the balance of said liquid organopolysiloxane composition being another liquid organopolysiloxane which is compatible with said first liquid organopolysiloxane, and polymerizing the impregnating organopolysiloxane composition.

5. An insulated electrical member comprising an electrical conductor having solid insulation applied thereto, said electrical member having its exterior surface provided with an elastomeric form-fitting cover of organopolysiloxane elastomer, the space within said elastomeric cover and the interstices in the electrical member being impregnated with a heat hardened organopolysiloxane composition, said composition being derived by applying a liquid polysiloxane having a viscosity of not over 10 poises at 25° C. whereby it penetrates into and completely fills all the spaces within the interior of the elastomeric cover about said electrical member and impregnates any interstices in the interior of the electrical member, said liquid organopolysiloxane composition comprising (a) at least 10% by weight of a siloxane having the formula

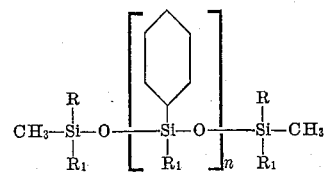

wherein R represents at least one monovalent organic radical selected from the group consisting of alkyl radicals having not more than four carbon atoms and phenyl, tolyl and xylyl radicals, $R_1$ represents at least one monovalent organic radical selected from the group consisting of methyl and vinyl groups, and $n$ is at least two and has an average value of from 2 to 10 and (b) the balance being another liquid organopolysiloxane which is compatible with said first liquid organopolysiloxane, and heating the applied liquid organopolysiloxane to a hardened state.

References Cited in the file of this patent

UNITED STATES PATENTS

| | | |
|---|---|---|
| 2,486,162 | Hyde | Oct. 25, 1949 |
| 2,526,688 | Robinson et al. | Oct. 24, 1950 |
| 2,645,628 | Hurd | July 14, 1953 |

OTHER REFERENCES

Gregory: Uses and Applications of Chemicals and Related Materials, Reinhold Publishing Corporation (1939).